United States Patent
Li et al.

(10) Patent No.: US 10,554,581 B2
(45) Date of Patent: Feb. 4, 2020

(54) NETWORK ON CHIP, COMMUNICATION CONTROL METHOD, AND CONTROLLER

(71) Applicant: Huawei Technologies Co., Ltd., Shenzhen (CN)

(72) Inventors: Yang Li, Hangzhou (CN); Qinye Huang, Hangzhou (CN); Kunpeng Song, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 158 days.

(21) Appl. No.: 15/606,609

(22) Filed: May 26, 2017

(65) Prior Publication Data

US 2017/0272381 A1    Sep. 21, 2017

Related U.S. Application Data

(63) Continuation of application No. PCT/CN2014/092532, filed on Nov. 28, 2014.

(51) Int. Cl.
*H04L 12/28* (2006.01)
*H04L 12/933* (2013.01)

(52) U.S. Cl.
CPC .......... *H04L 49/109* (2013.01); *H04L 49/103* (2013.01); *H04L 49/15* (2013.01)

(58) Field of Classification Search
CPC ..... H04L 49/109; H04L 49/15; H04L 49/103; H04L 29/08
USPC ................ 370/235, 216, 217, 218, 221, 392
See application file for complete search history.

(56) References Cited

U.S. PATENT DOCUMENTS

| 2009/0157976 A1 | 6/2009 | Comparan et al. |
| 2009/0300335 A1 | 12/2009 | Muff et al. |
| 2010/0027421 A1* | 2/2010 | Goossens .............. H04L 43/028 370/235 |

(Continued)

FOREIGN PATENT DOCUMENTS

| CN | 101485147 A | 7/2009 |
| CN | 101534251 A | 9/2009 |

(Continued)

OTHER PUBLICATIONS

Chen, L., et al., "NoRD: Node-Router Decoupling for Effective Power-gating of On-Chip Routers", IEEE Computer Society, 2012 IEEE/ACM 45th Annual International Symposium on Microarchitecture, Dec. 1-5, 2012, pp. 270-281.

*Primary Examiner* — Chuong T Ho
(74) *Attorney, Agent, or Firm* — Slater Matsil, LLP

(57) ABSTRACT

A network on chip (NoC), a communication control method, and a controller are provided. The NoC includes multiple routers and multiple network interfaces NIs, each router in the multiple routers is connected to one local node device using one NI, and each router includes one output port connected to an NI, one input port connected to the NI, multiple output ports connected to other routers, and multiple input ports connected to other routers; there is an input bypass channel between the output port that is connected to an NI and of each router and each input port that is connected to another router and of the router. There is an output bypass channel between the input port that is connected to an NI and of each router and each output port that is connected to another router and of the router.

12 Claims, 6 Drawing Sheets

(56) References Cited

U.S. PATENT DOCUMENTS

| | | | | |
|---|---|---|---|---|
| 2010/0111088 A1* | 5/2010 | Olofsson | ........... | G06F 15/17381 |
| | | | | 370/392 |
| 2012/0099475 A1* | 4/2012 | Tokuoka | ............... | H04L 49/109 |
| | | | | 370/253 |
| 2013/0136129 A1* | 5/2013 | Locatelli | ................. | H04L 45/74 |
| | | | | 370/392 |
| 2013/0142066 A1* | 6/2013 | Yamaguchi | ........... | H04L 49/109 |
| | | | | 370/252 |
| 2013/0194927 A1* | 8/2013 | Yamaguchi | ........... | H04L 49/109 |
| | | | | 370/235 |
| 2013/0262735 A1 | 10/2013 | Ikeda | | |
| 2013/0294458 A1* | 11/2013 | Yamaguchi | ......... | G06F 15/7825 |
| | | | | 370/412 |
| 2015/0109024 A1* | 4/2015 | Abdelfattah | ........ | G06F 17/5054 |
| | | | | 326/41 |
| 2016/0043977 A1* | 2/2016 | Schwetman, Jr. | .... | G06F 3/0608 |
| | | | | 711/133 |

FOREIGN PATENT DOCUMENTS

| | | |
|---|---|---|
| CN | 101808032 A | 8/2010 |
| CN | 103283192 A | 9/2013 |
| CN | 103368931 A | 10/2013 |
| EP | 2680515 A1 | 1/2014 |
| WO | 9731462 A1 | 8/1997 |

\* cited by examiner

NETWORK ON CHIP, COMMUNICATION CONTROL METHOD, AND CONTROLLER

CROSS-REFERENCE TO RELATED APPLICATIONS

This application is a continuation of International Application No. PCT/CN2014/092532, filed on Nov. 28, 2014, the disclosure of which is hereby incorporated by reference in its entirety.

TECHNICAL FIELD

The present disclosure relates to the field of computer technologies, and in particular, to a network on chip, a communication control method, and a controller.

A network on chip (NoC) uses a concept of a computer communications network, uses switching and routing technologies to replace a bus technology, and gradually becomes a mainstream interconnection solution inside a chip. As shown in FIG. 1, a conventional NoC architecture includes multiple routers and network interfaces (NI). Each router is corresponding to one local node device, and the router is connected to the corresponding local node device using an NI. The second router in the second row shown in FIG. 1 is used as an example. Specific structures of the router and the NI are shown in FIG. 2. The router mainly includes a routing computation (RC) module, a virtual channel allocator and switch allocator (VA&SA), a crossbar (Crossbar), and a first in first out queue (FIFO). Ports $X+_i$, $X-_i$, $Y+_i$, and $Y-_i$, are input ports that the router uses to connect to other routers in four directions X+, X−, Y+, and Y−. Ports $X+_o$, $X-_o$, $Y+_o$, and $Y-_o$ are output ports that the router uses to connect to other routers in the four directions of X+, X−, Y+, and Y−. A port $NI_i$ is an input port that the router uses to connect to an NI, and a port $NI_o$ is an output port that the router uses to connect to NI. The NI mainly includes a buffer and a core circuit.

In the NoC, router power consumption occupies a large proportion of entire NoC power consumption. To reduce NoC power consumption, a power gating technology may be used. When a router is idle, power of each part in the router is cut off, making the router in a non-working state. A goal of reducing the NoC power consumption is achieved by reducing the router power consumption. When there is to-be-transmitted data on the router, the router is woken up again, that is, each part in the router is controlled to be powered on again, such that the router is re-enabled to be in a working state.

However, although the foregoing control solution can reduce the NoC power consumption, if there is a router in the non-working state on a data transmission path, it is required to wait the router to be re-enabled, which causes a severe data transmission delay.

SUMMARY

Embodiments of the present disclosure provide a network on chip NoC, a communication control method, and a controller, so as to avoid a data transmission delay.

According to a first aspect, a network on chip NoC is provided, including multiple routers and multiple network interfaces NIs, where each router in the multiple routers is connected to one local node device using one NI. Each router includes one output port connected to an NI, one input port connected to the NI, multiple output ports connected to other routers, and multiple input ports connected to other routers. There is an input bypass channel between the output port that is connected to an NI and of each router and each input port that is connected to another router and of the router. There is an output bypass channel between the input port that is connected to an NI and of each router and each output port that is connected to another router and of the router.

With reference to the first aspect, in a first possible implementation manner, each NI in the multiple NIs includes one input port connected to a router and one output port connected to the router; and there is an NI bypass channel between the input port that is connected to a router and of each NI and the output port that is connected to a router and of the NI.

With reference to the first possible implementation manner of the first aspect, in a second possible implementation manner, each of the input bypass channel, the output bypass channel, and the NI bypass channel includes a link buffer; and when the link buffer is powered off, the link buffer performs data storage; and when the link buffer is powered on, the link buffer performs data transmission.

With reference to the second possible implementation manner of the first aspect, in a third possible implementation manner, the link buffer specifically includes a first P-type switching transistor, a second P-type switching transistor, a first N-type switching transistor, a second N-type switching transistor, and a phase inverter, where the first P-type switching transistor, the second P-type switching transistor, the first N-type switching transistor, and the second N-type switching transistor are connected sequentially, an input terminal of the first P-type switching transistor is used as a power connecting terminal of the link buffer, an output terminal of the second N-type switching transistor is used as a ground terminal of the link buffer, and a wiring terminal between the second P-type switching transistor and the first N-type switching transistor is used as an output terminal of the link buffer; a control terminal of the first P-type switching transistor is connected to an input terminal of the phase inverter, a wiring terminal formed after the connection is used as a control terminal of the link buffer, and an output terminal of the phase inverter is connected to a control terminal of the second N-type switching transistor; and a control terminal of the second P-type switching transistor is connected to a control terminal of the first N-type switching transistor, and a wiring terminal formed after the connection is used as an input terminal of the link buffer.

According to a second aspect, a communication control method in a network on chip NoC is provided, where the NoC includes multiple routers and multiple network interfaces NIs, each router in the multiple routers is connected to one local node device using one NI. The control method includes determining whether a router in the NoC is in a working state. The control method also includes, when the router is in a non-working state, controlling to-be-transmitted data of the router to be transmitted through a bypass channel of the router, where the router includes one output port connected to an NI, one input port connected to the NI, multiple output ports connected to other routers, and multiple input ports connected to other routers. There is an input bypass channel between the output port that is connected to an NI and of the router and each input port that is connected to another router and of the router. There is an output bypass channel between the input port that is connected to an NI and of the router and each output port that is connected to another router and of the router. Bypass channels of the router include the input bypass channel and the output bypass channel.

With reference to the second aspect, in a first possible implementation manner, the controlling to-be-transmitted data of the router to be transmitted through a bypass channel of the router specifically includes: when the to-be-transmitted data of the router comes from an input port that is connected to another router and of the router, transmitting, through an input bypass channel that is corresponding to the input port and in the bypass channels of the router, the to-be-transmitted data to the output port that is connected to an NI and of the router; or when the to-be-transmitted data of the router comes from the input port that is connected to an NI and of the router, determining a next-hop router of the router according to a destination address of the to-be-transmitted data; and transmitting, through an output bypass channel that is corresponding to the next-hop router and in the bypass channels of the router, the to-be-transmitted data to an output port that is connected to another router and of the router.

With reference to the second aspect or the first possible implementation manner of the second aspect, in a second possible implementation manner, when the router is in the non-working state, the method further includes: when to-be-transmitted data of an NI connected to the router comes from an input port that is connected to a router and of the NI, determining whether a destination address of the to-be-transmitted data is the same as an address of a local node device connected to the NI; and when the destination address of the to-be-transmitted data is not the same as the address of the local node device connected to the NI, transmitting, through an NI bypass channel of the NI, the to-be-transmitted data to an output port that is connected to a router and of the NI, where the NI includes one input port connected to a router and one output port connected to the router, and the NI bypass channel of the NI is located between the input port that is connected to a router and of the NI and the output port that is connected to a router and of the NI.

According to a third aspect, a controller in a network on chip NoC is provided, where the NoC includes multiple routers and multiple network interfaces NIs, each router in the multiple routers is connected to one local node device using one NI. The controller includes: a determining unit, configured to determine whether a router in the NoC is in a working state. The controller also includes a control unit, configured to: when the router is in a non-working state, control to-be-transmitted data of the router to be transmitted through a bypass channel of the router, where the router includes one output port connected to an NI, one input port connected to the NI, multiple output ports connected to other routers, and multiple input ports connected to other routers. There is an input bypass channel between the output port that is connected to an NI and of the router and each input port that is connected to another router and of the router; there is an output bypass channel between the input port that is connected to an NI and of the router and each output port that is connected to another router and of the router. Bypass channels of the router include the input bypass channel and the output bypass channel.

With reference to the third aspect, in a first possible implementation manner, the control unit is specifically configured to: when the to-be-transmitted data of the router comes from an input port that is connected to another router and of the router, transmit, through an input bypass channel that is corresponding to the input port and in the bypass channels of the router, the to-be-transmitted data to the output port that is connected to the NI and of the router; or when the to-be-transmitted data of the router comes from the input port that is connected to an NI and of the router, determine a next-hop router of the router according to a destination address of the to-be-transmitted data; and transmit, through an output bypass channel that is corresponding to the next-hop router and in the bypass channels of the router, the to-be-transmitted data to an output port that is connected to another router and of the router.

With reference to the third aspect or the first possible implementation manner of the third aspect, in a second possible implementation manner, control unit is further configured to: when the router is in the non-working state, and to-be-transmitted data of an NI connected to the router comes from an input port that is connected to a router and of the NI, determine whether a destination address of the to-be-transmitted data is the same as an address of a local node device connected to the NI; and when the destination address of the to-be-transmitted data is not the same as the address of the local node device connected to the NI, transmit, through an NI bypass channel of the NI, the to-be-transmitted data to an output port that is connected to a router and of the NI, where the NI includes one input port connected to a router and one output port connected to the router, and the NI bypass channel of the NI is located between the input port that is connected to a router and of the NI and the output port that is connected to a router and of the NI.

According to the network on chip NoC provided by the first aspect, the communication control method in the network on chip NoC provided by the second aspect, and the controller in the network on chip NoC provided by the third aspect, a bypass channel is configured on a router of the NoC. When the router is in a non-working state, data transmission may be performed through the bypass channel of the router, thereby avoiding a data transmission delay.

BRIEF DESCRIPTION OF THE DRAWINGS

The drawings are provided to further understand the present disclosure, and they constitute a part of the application. The drawings, along with the embodiments of the present disclosure, are used to explain the present disclosure, and pose no limitation on the present disclosure. In the drawings.

DETAILED DESCRIPTION OF ILLUSTRATIVE EMBODIMENTS

To provide an implementation solution for avoiding a data transmission delay, embodiments of the present disclosure provide an NoC, a communication control method, and a controller. In the following, embodiments of the present disclosure are described in detail with reference to the accompanying drawings. It should be understood that the embodiments described herein are merely used to illustrate and explain the present disclosure, but are not intended to limit the present disclosure. Moreover, in a case that no conflict occurs, the embodiments in the application and features in the embodiments may be mutually combined.

Embodiment 1

This embodiment of the present disclosure provides an NoC. An architecture of the NoC shown in FIG. 3 includes multiple routers and multiple NIs. Each router in the multiple routers is connected to one local node device using one NI, that is, each router is corresponding to one local node device. Compared with a conventional NoC, the NoC provided by this embodiment of the present disclosure further includes a bypass channel (denoted by a dashed line in FIG. 3). Specifically, as shown in FIG. 4, in the NoC provided by this embodiment of the present disclosure, each router includes one output port connected to an NI, one input port connected to the NI, multiple output ports connected to other routers, and multiple input ports connected to other routers. There is an input bypass channel between the output port that is connected to an NI and of each router and each input port that is connected to another router and of the router. There is an output bypass channel between the input port that is connected to an NI and of each router and each output port that is connected to another router and of the router.

Figure 1:
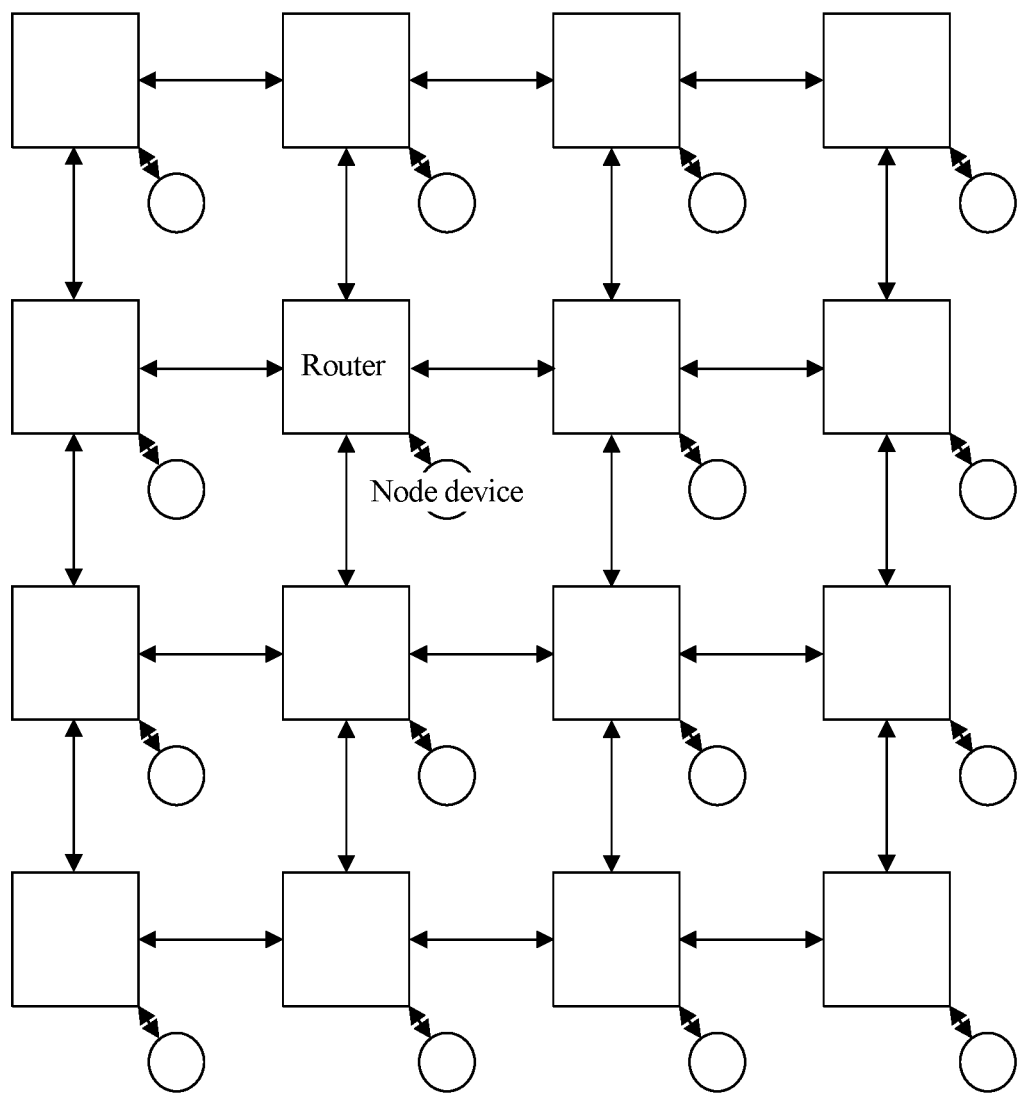
FIG. 1 is a schematic architectural diagram of a conventional NoC.
Figure 2:
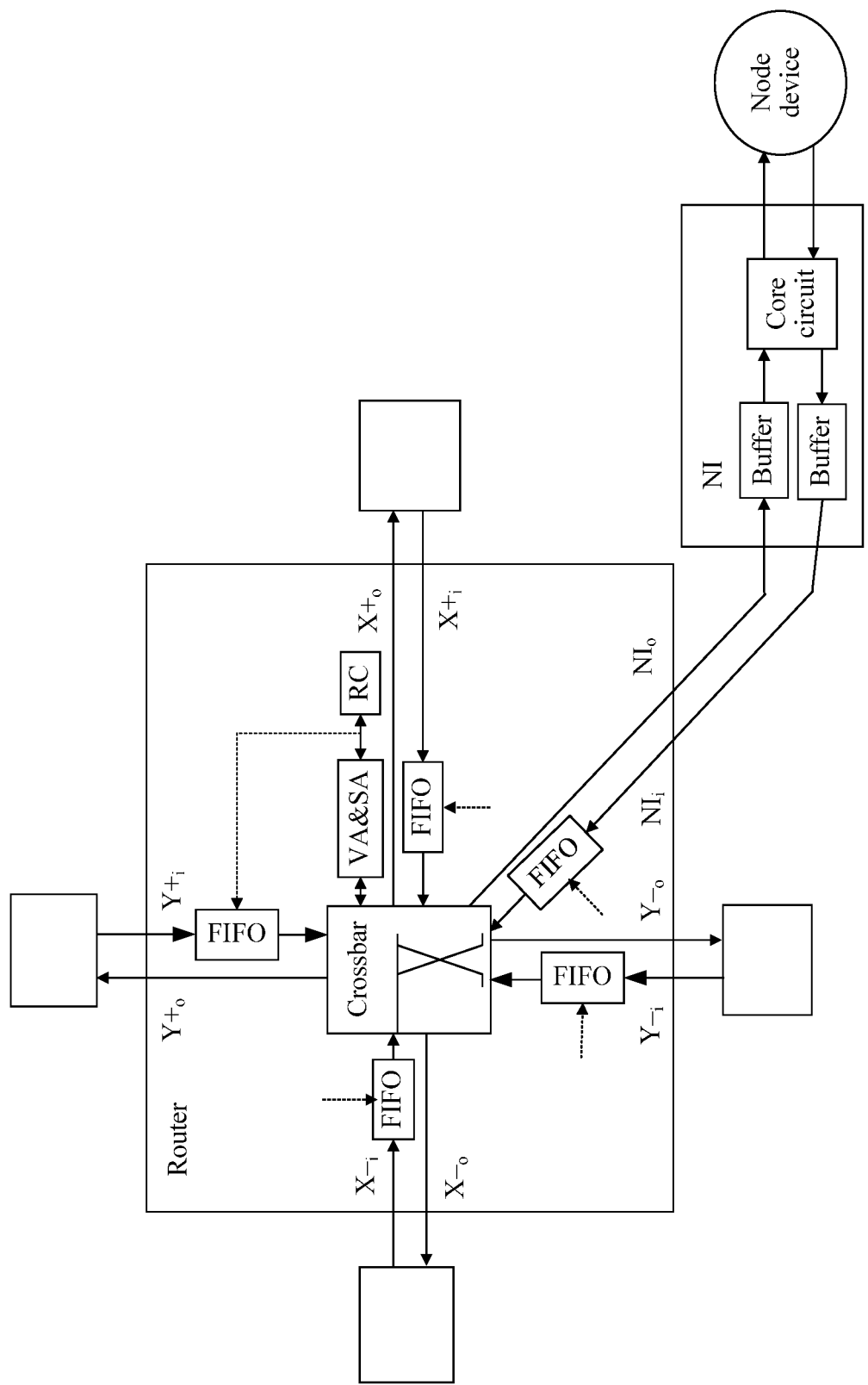
FIG. 2 is a schematic structural diagram of a router and an NI in a conventional NoC.
Figure 3:
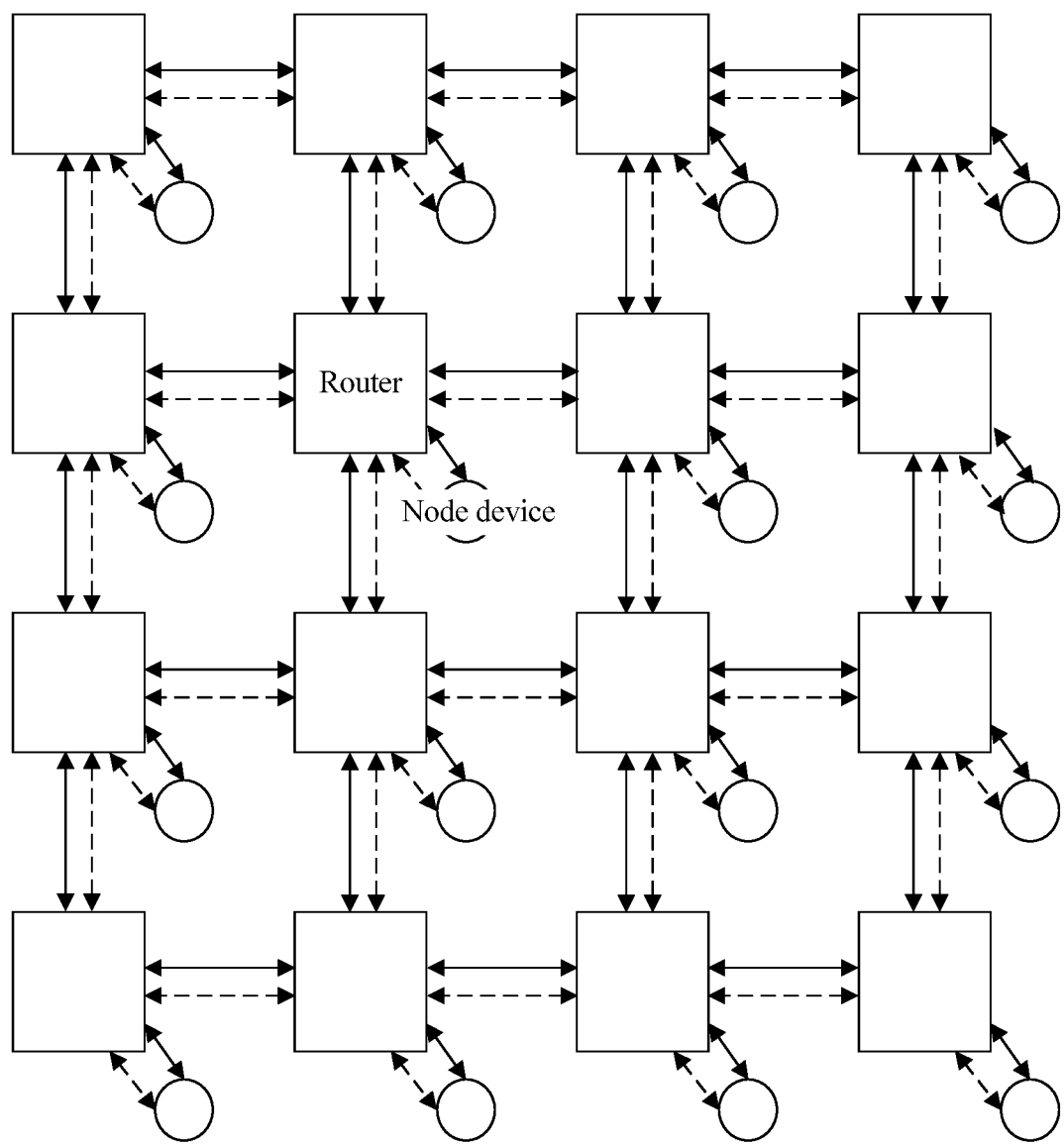
FIG. 3 is a schematic architectural diagram of an NoC according to Embodiment 1 of the present disclosure.
Figure 4:
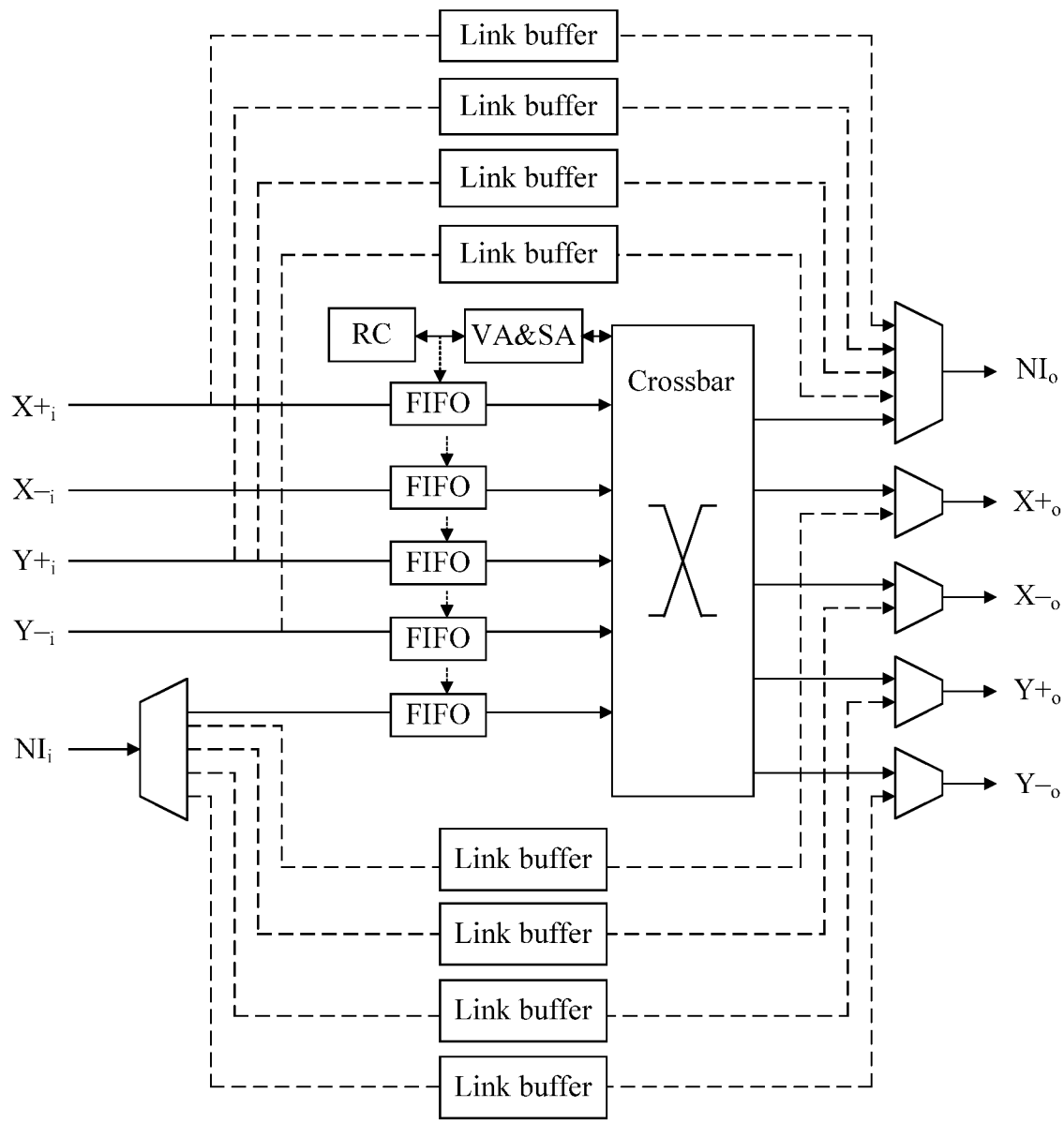
FIG. 4 is a schematic structural diagram of a router in an NoC according to Embodiment 1 of the present disclosure.

The second router in the second row shown in FIG. 3 is used as an example. The router has eight bypass channels in total, including four input bypass channels and four output bypass channels.

There is an input bypass channel between each of input ports $X+_i$, $X-_i$, $Y+_i$, and $Y-_i$ that are connected to other routers and of the router and an output port $NI_o$ that is connected to an NI and of the router. There is an output bypass channel between each of output ports $X+_o$, $X-_o$, $Y+_o$, and $Y-_o$ that are connected to other routers and of the router and an input port $NI_i$ that is connected to an NI and of the router.

Preferably, to ensure that data is not discarded when congestion occurs, each of the foregoing input bypass channel and output bypass channel may specifically include a link buffer.

When a router is idle, each part of the router is powered off, or the router is in a non-working state, the NoC provided by this embodiment of the present disclosure may control to-be-transmitted data of the router to be transmitted through bypass channels of the router. In this embodiment of the present disclosure, this control step may be specifically executed by a prior-art controller that controls power-on and power-off of each part of the router, which is specifically as follows:

When the to-be-transmitted data of the router comes from an input port that is connected to another router and of the router, through an input bypass channel that is corresponding to the input port and in the bypass channels of the router, the to-be-transmitted data is transmitted to an output port that is connected to an NI and of the router. That is, when the router is in the non-working state, through the input bypass channel, data that another router in the NoC transmits to the router can still be transmitted to an NI connected to the router, and further can be transmitted to a local node device corresponding to the router.

When the to-be-transmitted data of the router comes from an input port that is connected to an NI and of the router, a next-hop router of the router is determined according to a destination address of the to-be-transmitted data. Through an output bypass channel that is corresponding to the next-hop router and in the bypass channels of the router, the to-be-transmitted data is transmitted to an output port that is connected to another router and of the router. That is, when the router is in the non-working state, through the output bypass channel, data that an NI connected to the router transmits to the router can still be transmitted to another router in the NoC, that is, data of a local node device corresponding to the router can be transmitted to the NoC, and it can be ensured that data is transmitted on a shortest path.

In actual implementation, the controller may obtain the destination address of the to-be-transmitted data from header information of the to-be-transmitted data.

When the foregoing controller determines the next-hop router, the controller itself may compute the next-hop router according to the destination address of the to-be-transmitted data and a shortest transmission path of the to-be-transmitted data. Preferably, because an RC module of the router has the computation function, when the router is idle, the RC module of the router may be controlled not to be powered off, and other parts VA&SA, Crossbar, and FIFO of the router are controlled to be powered off. The controller sends the destination address of the to-be-transmitted data to the RC module of the router, the RC module of the router computes the next-hop router, and the controller directly obtains a computation result from the RC module of the router.

Figure 5:
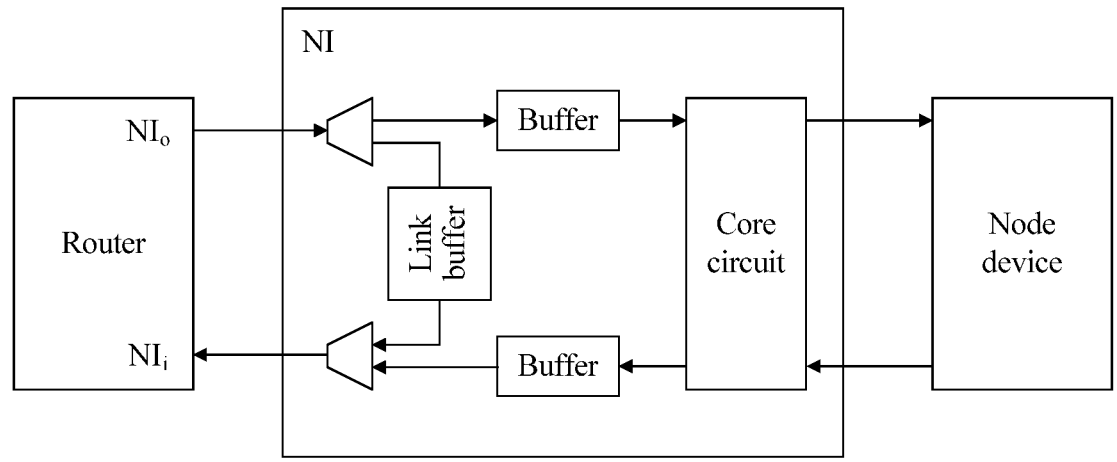
FIG. 5 is a schematic structural diagram of an NI in an NoC according to Embodiment 1 of the present disclosure.

Further, in the NoC provided by this embodiment of the present disclosure, as shown in FIG. 5, each NI in the multiple NIs includes one input port connected to a router and one output port connected to the router. There is an NI bypass channel between the input port that is connected to a router and of each NI and the output port that is connected to a router and of the NI.

Preferably, to ensure that data is not discarded when congestion occurs, the NI bypass channel may also specifically include a link buffer. The foregoing controller may be further configured to: when a router is in a non-working state, and if to-be-transmitted data of an NI connected to the router comes from an input port that is connected to a router and of the NI, determine whether a destination address of the to-be-transmitted data is the same as an address of a local node device connected to the NI, that is, determine whether the local node device connected to the NI is a destination node; when the destination address of the to-be-transmitted data is the same as the address of the local node device connected to the NI, which indicates that the local node device connected to the NI is the destination node, transmit the to-be-transmitted data to the local node device; or when the destination address of the to-be-transmitted data is not the same as the address of the local node device connected to the NI, which indicates that the local node device connected to the NI is not the destination node, transmit, through the NI bypass channel of the NI, the to-be-transmitted data to an output port that is connected to a router and of the NI, where the to-be-transmitted data needs to be reinjected into the NoC for routing; and subsequently, the controller determines a next-hop router based on the destination address of the to-be-transmitted data, and transmits the to-be-transmitted data to the next-hop router through a corresponding output bypass channel.

When the to-be-transmitted data of the NI connected to the router comes from an input port that is connected to a local node device and of the NI, the to-be-transmitted data is transmitted to the output port that is connected to a router and of the NI; similarly, the controller subsequently determines a next-hop router based on the destination address of the to-be-transmitted data, and transmits the to-be-transmitted data to the next-hop router through a corresponding output bypass channel.

When data on multiple paths conflicts, the controller may also perform arbitration.

Further, to reduce power consumption of link buffers in the input bypass channel, the output bypass channel, and the NI bypass channel, a link buffer with gating may be used. When the link buffer is powered off, the link buffer performs data storage, and does not perform data transmission, that is, a corresponding bypass channel does not perform data transmission; and when the link buffer is powered on, the link buffer performs data transmission, that is, a corresponding bypass channel performs data transmission.

The link buffer with gating may have multiple implementation manners. For example, as shown in FIG. 6, the link buffer specifically includes a first P-type switching transistor, a second P-type switching transistor, a first N-type switching transistor, a second N-type switching transistor, and a phase inverter, where the first P-type switching transistor, the second P-type switching transistor, the first N-type switching transistor, and the second N-type switching transistor are connected sequentially, that is, an output terminal of the first P-type switching transistor is connected to an input terminal of the second P-type switching transistor, an output terminal of the second P-type switching transistor is connected to an input terminal of the first N-type switching transistor, and an output terminal of the first N-type switching transistor is connected to an input terminal of the second N-type switching transistor; the input terminal of the first P-type switching transistor is used as a power connecting terminal Vd of the link buffer, an output terminal of the second N-type switching transistor is used as a ground terminal of the link buffer, and a wiring terminal between the second P-type switching transistor and the first N-type switching transistor is used as an output terminal O of the link buffer; a control terminal of the first P-type switching transistor is connected to an input terminal of the phase inverter, and a wiring terminal formed after the connection is used as a control terminal L_Ctrl of the link buffer; an output terminal of the phase inverter is connected to a control terminal of the second N-type switching transistor; and a control terminal of the second P-type switching transistor is connected to a control terminal of the first N-type switching transistor, and a wiring terminal formed after the connection is used as an input terminal I of the link buffer.

Figure 6:
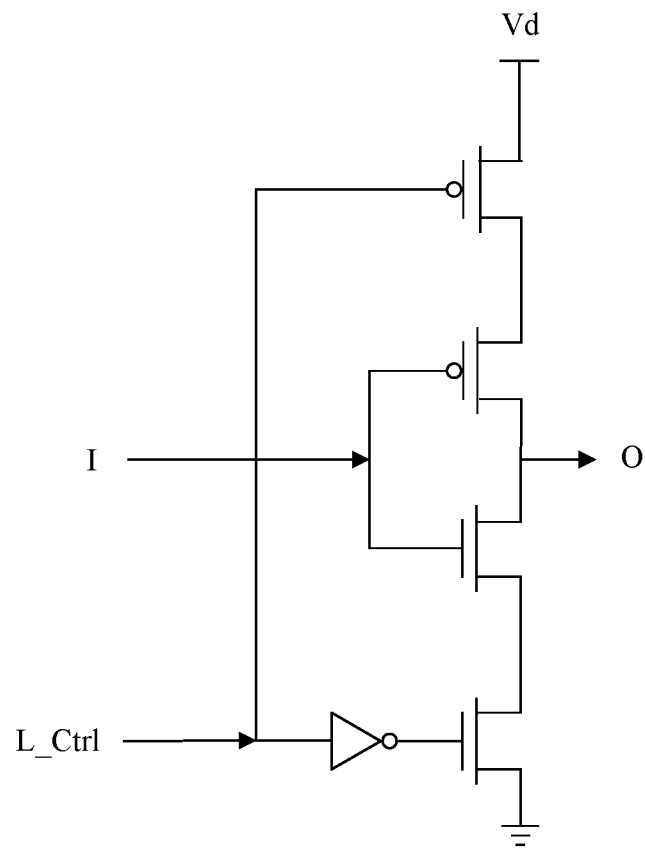
FIG. 6 is a schematic structural diagram of a link buffer according to Embodiment 1 of the present disclosure.

As shown in FIG. 6, when a high-level signal is input from the control terminal L_Ctrl, the link buffer is powered off, that is, the link buffer is disabled, transmission data may be temporarily stored, and data transmission is not performed through a corresponding bypass channel; and when a low-level signal is input from the control terminal L_Ctrl, the link buffer is powered on, that is, the link buffer is enabled, and data transmission is performed through a corresponding bypass channel.

The link buffer is controlled by two aspects as follows.

When the router is in a working state, all the input bypass channel, the output bypass channel, and the NI bypass channel are disabled, and the link buffers are disabled; and when the router is in a non-working state, the input bypass channel, the output bypass channel, and the NI bypass channel are used to transmit data, and if data congestion exists, corresponding link buffers are controlled to be disabled, and the data is temporarily stored; otherwise, the link buffers are enabled, and data transmission is performed.

The link buffer shown in FIG. 6 is only an example, but is not intended to limit the present disclosure.

After an idle router is disabled, the router may be woken up again when an amount of to-be-transmitted data of the router is relatively large, for example, when the amount of the to-be-transmitted data of the router is greater than a preset data amount. Moreover, before the router is completely woken up, data is still transmitted through a bypass channel. Preferably, if a next-hop router of the router is also in the non-working state, the next-hop router may be further woken up, that is, each part that is powered off and of the router is controlled to be powered on again, such that the router is re-enabled to be in a working state.

In actual implementation, the controller may obtain the amount of the to-be-transmitted data from header information of the to-be-transmitted data.

That is, before the router resumes the working state, the to-be-transmitted data of the router is transmitted on a shortest path through the bypass channel of the router, and this avoids a data transmission delay and takes effects of both power consumption and data transmission into consideration.

Embodiment 2

Figure 7:
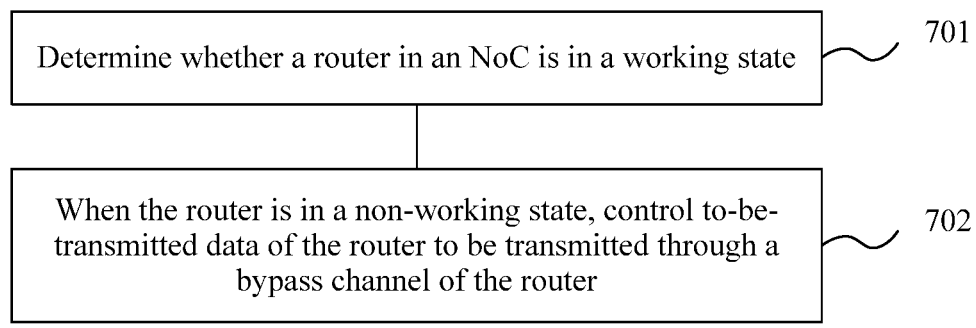
FIG. 7 is a schematic flowchart of a communication control method in an NoC according to Embodiment 2 of the present disclosure.

This embodiment of the present disclosure further provides a communication control method in an NoC, where the NoC includes multiple routers and multiple network interfaces NIs, each router in the multiple routers is connected to one local node device using one NI; each router includes one output port connected to an NI, one input port connected to the NI, multiple output ports connected to other routers, and multiple input ports connected to other routers; there is an input bypass channel between the output port that is connected to an NI and of the router and each input port that is connected to another router and of the router; there is an output bypass channel between the input port that is connected to an NI and of the router and each output port that is connected to another router and of the router; and bypass channels of the router include the input bypass channel and the output bypass channel. The foregoing communication control method in the NoC is shown in FIG. 7, and specifically includes the following steps.

Step 701: Determine whether a router in the NoC is in a working state.

Step 702: When the router is in a non-working state, control to-be-transmitted data of the router to be transmitted through a bypass channel of the router.

Further, the controlling to-be-transmitted data of the router to be transmitted through a bypass channel of the router in step 702 specifically includes: when the to-be-transmitted data of the router comes from an input port that is connected to another router and of the router, transmitting, through an input bypass channel that is corresponding to the input port and in bypass channels of the router, the to-be-transmitted data to an output port that is connected to an NI and of the router. That is, when the router is in the non-working state, through the input bypass channel, data that another router in the NoC transmits to the router can still be transmitted to an NI connected to the router, and further can be transmitted to a local node device corresponding to the router; or when the to-be-transmitted data of the router comes from an input port that is connected to an NI and of the router, determining a next-hop router of the router according to a destination address of the to-be-transmitted data; and transmitting, through an output bypass channel that is corresponding to the next-hop router and in bypass channels of the router, the to-be-transmitted data to an output port that is connected to another router and of the router. That is, when the router is in the non-working state, through the output bypass channel, data that an NI connected to the router transmits to the router can still be transmitted to another router in the NoC, that is, data of a local node device corresponding to the router can be transmitted to the NoC, and it can be ensured that data is transmitted on a shortest path.

In actual implementation, the destination address of the to-be-transmitted data may be obtained from header information of the to-be-transmitted data.

When the next-hop router is being determined, the next-hop router may be computed based on the destination address of the to-be-transmitted data and according to a shortest transmission path of the to-be-transmitted data. Preferably, because an RC module of the router has the computation function, when the router is idle, the RC module of the router may be controlled not to be powered off, and other parts VA&SA, Crossbar, and FIFO of the router are controlled to be powered off. The destination address of the to-be-transmitted data is sent to the RC module of the router, and the RC module of the router computes the next-hop router and directly obtains a computation result from the RC module of the router.

Further, each NI in the foregoing NoC includes one input port connected to a router and one output port connected to the router; and an NI bypass channel of the NI is located between the input port that is connected to a router and of the NI and the output port that is connected to a router and of the NI. When the router is in the non-working state, the foregoing communication control method further includes: when to-be-transmitted data of an NI connected to the router comes from an input port that is connected to a router and of the NI, determining whether a destination address of the to-be-transmitted data is the same as an address of a local node device connected to the NI, that is, determining whether the local node device connected to the NI is a destination node; and when the destination address of the to-be-transmitted data is the same as the address of the local node device connected to the NI, which indicates that the local node device connected to the NI is the destination node, transmitting the to-be-transmitted data to the local node device; or when the destination address of the to-be-transmitted data is not the same as the address of the local node device connected to the NI, transmitting, through an NI bypass channel of the NI, the to-be-transmitted data to an output port that is connected to a router and of the NI, where the to-be-transmitted data needs to be reinjected into the NoC for routing; and subsequently, determining a next-hop router based on the destination address of the to-be-transmitted data, and transmitting the to-be-transmitted data to the next-hop router through a corresponding output bypass channel.

Further, when the to-be-transmitted data of the NI connected to the router comes from an input port that is connected to a local node device and of the NI, the to-be-transmitted data is transmitted to the output port that is connected to a router and of the NI; similarly, a next-hop router is subsequently determined based on the destination address of the to-be-transmitted data, and the to-be-transmitted data is transmitted to the next-hop router through a corresponding output bypass channel.

Preferably, each of the foregoing input bypass channel, output bypass channel, and NI bypass channel may further include a link buffer with gating. When the link buffer is controlled to be powered off by controlling a control terminal of the link buffer, the link buffer is disabled, transmission data may be temporarily stored, and the link buffer does not perform data transmission, that is, data transmission is not performed through a corresponding bypass channel; and when the link buffer is controlled to be powered on by controlling the control terminal of the link buffer, the link buffer is enabled and performs data transmission, that is, data transmission is performed through a corresponding bypass channel.

Embodiment 3

Figure 8:
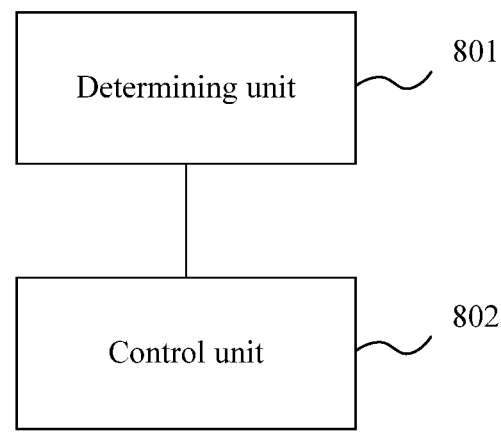
FIG. 8 is a schematic structural diagram of a controller in an NoC according to Embodiment 3 of the present disclosure.

Based on a same inventive concept, and according to the communication control method provided by the foregoing embodiment of the present disclosure, correspondingly, this embodiment of the present disclosure further provides a controller in an NoC, where a schematic structural diagram of the controller is shown in FIG. 8, and the controller specifically includes: a determining unit 801, configured to determine whether a router in the NoC is in a working state; a control unit 802, configured to: when the router is in a non-working state, control to-be-transmitted data of the router to be transmitted through a bypass channel of the router, where the router includes one output port connected to an NI, one input port connected to the NI, multiple output ports connected to other routers, and multiple input ports connected to other routers; there is an input bypass channel between the output port that is connected to an NI and of the router and each input port that is connected to another router and of the router; there is an output bypass channel between the input port that is connected to an NI and of the router and each output port that is connected to another router and of the router; and bypass channels of the router include the input bypass channel and the output bypass channel.

Further, the control unit 802 is specifically configured to: when the to-be-transmitted data of the router comes from an input port that is connected to another router and of the router, transmit, through an input bypass channel that is corresponding to the input port and in the bypass channels of the router, the to-be-transmitted data to the output port that is connected to an NI and of the router; or when the to-be-transmitted data of the router comes from the input port that is connected to an NI and of the router, determine a next-hop router of the router according to a destination address of the to-be-transmitted data; and transmit, through an output bypass channel that is corresponding to the next-hop router and in the bypass channels of the router, the to-be-transmitted data to an output port that is connected to another router and of the router.

Preferably, the control unit 802 is further configured to: when the router is in the non-working state, and to-be-transmitted data of an NI connected to the router comes from an input port that is connected to a router and of the NI, determine whether a destination address of the to-be-transmitted data is the same as an address of a local node device connected to the NI; and when the destination address of the to-be-transmitted data is not the same as the address of the local node device connected to the NI, transmit, through an NI bypass channel of the NI, the to-be-transmitted data to an output port that is connected to a router and of the NI, where the NI includes one input port connected to a router and one output port connected to the router, and the NI bypass channel of the NI is located between the input port that is connected to a router and of the NI and the output port that is connected to a router and of the NI.

Functions of the foregoing units may be corresponding to corresponding processing steps in the foregoing communication control method process, and are not repeatedly described herein.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, such that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, such that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, such that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Although some embodiments of the present disclosure have been described, persons skilled in the art can make changes and modifications to these embodiments once they learn the basic inventive concept. Therefore, the following claims are intended to be construed as to cover the embodiments and all changes and modifications falling within the scope of the present disclosure.

Obviously, persons skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. A network on chip (NoC), comprising:
   a plurality of network interfaces (NIs); and
   a plurality of routers, each router in the plurality of routers being connected to one local node device using a corresponding NI, each router of the plurality of routers comprising:
      a first output port connected to the corresponding NI;
      a first input port connected to the corresponding NI;
      a plurality of second output ports connected to other routers of the plurality of routers;
      a plurality of second input ports connected to the other routers of the plurality of routers;
      an input bypass channel coupling the first output port and each second input port of the plurality of second input ports using a first corresponding link buffer of a plurality of link buffers; and
      an output bypass channel coupling the first input port and each second output port of the plurality of second output ports using a second corresponding link buffer of the plurality of link buffers;
   wherein each NI of the plurality of NIs comprises:
      a third input port connected to a corresponding router of the plurality of routers;
      a third output port connected to the corresponding router of the plurality of routers; and
      an NI bypass channel coupling the third input port and the third output port using a third corresponding link buffer of the plurality of link buffers.

2. The NoC according to claim 1, wherein each link buffer of the plurality of link buffers is configured to:
   when that link buffer is powered off, that link buffer performs data storage; and
   when that link buffer is powered on, that link buffer performs data transmission.

3. The NoC according to claim 2, wherein each link buffer of the plurality of link buffers comprises:
   a first P-type switching transistor;
   a second P-type switching transistor;
   a first N-type switching transistor;
   a second N-type switching transistor; and
   a phase inverter;
   wherein the first P-type switching transistor, the second P-type switching transistor, the first N-type switching transistor, and the second N-type switching transistor are connected sequentially, an input terminal of the first P-type switching transistor is used as a power connecting terminal of that link buffer, an output terminal of the second N-type switching transistor is used as a ground terminal of that link buffer, and a wiring terminal between the second P-type switching transistor and the first N-type switching transistor is used as an output terminal of that link buffer;
   wherein a control terminal of the first P-type switching transistor is connected to an input terminal of the phase inverter, a wiring terminal formed after the connection is used as a control terminal of that link buffer, and an output terminal of the phase inverter is connected to a control terminal of the second N-type switching transistor; and
   wherein a control terminal of the second P-type switching transistor is connected to a control terminal of the first N-type switching transistor, and a wiring terminal formed after the connection is used as an input terminal of that link buffer.

4. The NoC according to claim 1, wherein the plurality of routers have a one-to-one correspondence to a plurality of local node devices.

5. A method in a network on chip (NoC), comprising:
determining whether a first router in the NoC is powered off, wherein the NoC comprises a plurality of routers and a plurality of network interfaces (NIs), and each router in the plurality of routers is connected to one local node device using one NI; and
when the first router is powered off, controlling to-be-transmitted data of the first router to be transmitted through a bypass channel of the first router, wherein the first router comprises one output port connected to an NI, one input port connected to the NI, a plurality of output ports connected to other routers, and a plurality of input ports connected to other routers;
wherein there is an input bypass channel between the output port that is connected to the NI and each input port that is connected to another router;
wherein the input bypass channel comprises a first corresponding link buffer of a plurality of link buffers;
wherein there is an output bypass channel between the input port that is connected to the NI and each output port that is connected to another router;
wherein the output bypass channel comprises a second corresponding link buffer of the plurality of link buffers;
wherein there is a NI bypass channel between a NI input port that is connected to the first router and a NI output port that is connected to the first router;
wherein the NI bypass channel comprises a third corresponding link buffer of the plurality of link buffers; and
wherein bypass channels of the router comprise the input bypass channel, the output bypass channel, and the NI bypass channel.

6. The method according to claim 5, wherein controlling the to-be-transmitted data of the first router to be transmitted through a bypass channel of the first router comprises:
when the to-be-transmitted data of the first router comes from an input port that is connected to another router, transmitting, through an input bypass channel that corresponds to the input port and is comprised in the bypass channels of the first router, the to-be-transmitted data to the output port that is connected to an NI.

7. The method according to claim 5, wherein when the first router is powered off, the method further comprises:
when to-be-transmitted data of an NI connected to the first router comes from an input port that is connected to a router, determining whether a destination address of the to-be-transmitted data equals an address of a local node device connected to the NI; and
when the destination address of the to-be-transmitted data does not equal the address of the local node device connected to the NI, transmitting, through an NI bypass channel of the NI, the to-be-transmitted data to an output port that is connected to a router and of the NI, wherein the NI comprises one input port connected to a router and one output port connected to the router, and the NI bypass channel of the NI is located between the input port that is connected to a router and the output port that is connected to a router.

8. The method according to claim 5, wherein controlling the to-be-transmitted data of the first router to be transmitted through a bypass channel of the first router comprises:
when the to-be-transmitted data of the first router comes from the input port that is connected to the NI, determining a next-hop router of the first router according to a destination address of the to-be-transmitted data, and transmitting, through an output bypass channel that corresponds to the next-hop router and is comprised in the bypass channels of the first router, the to-be-transmitted data to an second output port that is connected to another router.

9. A controller in a network on chip (NoC), comprising:
a processor; and
a computer-readable storage medium storing a program to be executed by the processor, the program including instructions for:
determining whether a router in the NoC is powered off; and
when the router is powered off, controlling to-be-transmitted data of the router to be transmitted through a bypass channel of the router, wherein the router comprises one output port connected to a network interface (NI), one input port connected to the NI, a plurality of output ports connected to other routers, and a plurality of input ports connected to other routers;
wherein in each router there is an input bypass channel between the output port that is connected to an NI and each input port that is connected to another router;
wherein each input bypass channel comprises a first corresponding link buffer of a plurality of link buffers;
wherein in each router there is an output bypass channel between the input port that is connected to an NI and each output port that is connected to another router;
wherein each output bypass channel comprises a first corresponding link buffer of the plurality of link buffers;
wherein in each NI there is a NI bypass channel between a NI input port that is connected to a corresponding router and a NI output port that is connected to the corresponding router;
wherein each NI bypass channel comprises a third corresponding link buffer of the plurality of link buffers; and
wherein bypass channels of the router comprise the input bypass channel, the output bypass channel, and the NI bypass channel.

10. The controller according to claim 9, wherein the program further includes instructions for:
when the to-be-transmitted data of the router comes from an input port that is connected to another router, transmitting, through an input bypass channel that corresponds to the input port and is comprised in the bypass channels of the router, the to-be-transmitted data to the output port that is connected to the NI.

11. The controller according to claim 9, wherein the program further includes instructions for:
when the router is powered off, and to-be-transmitted data of an NI connected to the router comes from an input port that is connected to a router, determining whether a destination address of the to-be-transmitted data equals an address of a local node device connected to the NI; and
when the destination address of the to-be-transmitted data does not equal the address of the local node device connected to the NI, transmitting, through an NI bypass channel of the NI, the to-be-transmitted data to an output port that is connected to a router, wherein the NI comprises one input port connected to a router and one output port connected to the router, and the NI bypass channel of the NI is located between the input port that is connected to a router and the output port that is connected to a router.

12. The controller according to claim 9, wherein the program further includes instructions for:
   when the to-be-transmitted data of the router comes from the input port that is connected to an NI, determining a next-hop router of the router according to a destination address of the to-be-transmitted data, and transmitting, through an output bypass channel that corresponds to the next-hop router and in the bypass channels of the router, the to-be-transmitted data to an output port that is connected to another router and of the router.

* * * * *